(12) United States Patent
Gravlin

(10) Patent No.: US 6,353,853 B1
(45) Date of Patent: Mar. 5, 2002

(54) SYSTEM FOR MANAGEMENT OF BUILDING AUTOMATION SYSTEMS THROUGH AN HTML CLIENT PROGRAM

(75) Inventor: Keith Robert Gravlin, Sugar Hill, GA (US)

(73) Assignee: Triatek, Inc., Norcross, GA (US)

( * ) Notice: Subject to any disclaimer, the term of this patent is extended or adjusted under 35 U.S.C. 154(b) by 0 days.

(21) Appl. No.: 09/188,980

(22) Filed: Oct. 26, 1998

(51) Int. Cl.[7] .............................................. G06F 13/00
(52) U.S. Cl. ....................... 709/219; 709/217; 709/328; 702/188; 395/528.11
(58) Field of Search ................................. 709/203, 217, 709/218, 219, 230, 250, 313, 319, 328, 329; 702/188; 395/146, 188, 468.15, 528.1, 528.11, 528.34, 528.35

(56) References Cited

U.S. PATENT DOCUMENTS

| | | | |
|---|---|---|---|
| 3,916,405 A | | 10/1975 | Gotanda |
| 4,628,435 A | | 12/1986 | Tashiro et al. |
| 4,703,325 A | | 10/1987 | Chamberlin et al. |
| 4,771,865 A | | 9/1988 | Hinderling |
| 5,128,855 A | * | 7/1992 | Hilber et al. ................ 364/132 |
| 5,572,438 A | | 11/1996 | Ehlers et al. |
| 5,598,456 A | | 1/1997 | Feinberg |
| 5,611,059 A | | 3/1997 | Benton et al. |
| 5,619,655 A | | 4/1997 | Weng et al. |
| 5,675,756 A | | 10/1997 | Benton et al. |
| 5,777,895 A | | 7/1998 | Kuroda et al. |
| 5,909,545 A | * | 6/1999 | Frese, II et al. ............. 709/208 |
| 5,973,696 A | * | 10/1999 | Agranat et al. ............. 345/357 |
| 5,982,362 A | * | 11/1999 | Crater et al. ................ 345/327 |
| 6,028,998 A | * | 2/2000 | Gloudeman et al. ........ 395/701 |
| 6,061,603 A | * | 5/2000 | Papadopoulos et al. ....... 700/83 |

OTHER PUBLICATIONS

Patrick O'Neill, Ph.D., "Opening Up the Possibilities", *Engineered Systems*, Jun. 1998, pp. 60–67, vol. 15No. 6, BNP, Troy, MI.
Lynn M. Warne, Honeywell Inc. News Release, "Honeywell Plans Internet-Enabled Software for Buildings", Apr. 1998.

* cited by examiner

*Primary Examiner*—Viet D. Vu

(57) ABSTRACT

Bi-directional communications via TCP ("Transmission Control Protocol")/IP ("Internet Protocol") between an HTML client program (i.e. "web browser") and the linked or embedded HTML server ("Hypertext Markup Language") of a Building Automation System ("BAS") are used to provide an authorized user with access to the interactive graphical panels of the BAS allowing the user to, for instance, monitor, control, configure and interact with the BAS or multiple BAS's.

10 Claims, 4 Drawing Sheets

SYSTEM FOR MANAGEMENT OF BUILDING AUTOMATION SYSTEMS THROUGH AN HTML CLIENT PROGRAM

BACKGROUND

1. Field of Invention

This invention relates to the monitoring and control of a Building Automation System ("BAS") via Transmission Control Protocol/Internet Protocol ("TCP/IP") connections. For purposes of this invention, a BAS is a system that controls any or all of the environmental aspects of a facility including but not limited to lighting, HVAC, and security. More particularly, this invention relates to an authorized user(s) monitoring, controlling, configuring and interacting with a BAS and its linked or embedded HTML server by utilizing an HTML client program in bi-directional communication with the HTML server.

2. Background of the Invention

Linked or embedded HTML servers associated with one or more BAS's receive data via TCP/IP connections from the HTML Client Program (i.e. web browser) of an HTML capable device such as a Computer, Palm Pilot or other Personal Data Assistant (collectively "Client") that enables authorized users to monitor, control, configure and interact with one or more of the BAS's through the BAS's linked or embedded HTML server. The Client displays a BAS interface panel that varies in configuration but generally provides both monitoring and control capability with status indications, monitoring functions, and/or messages appearing on a graphical user interface (GUI) display. They may also include equipment diagrams with performance status, individual floor plans of the facilities under control, time of day scheduling for the facility, an operator defined group, specific zones, attendance messages resulting from troubleshooting and diagnostics functions. An authorized user of the Client is, thus, enabled to locally or remotely manage, control and configure a BAS through its linked or embedded HTML server without needing any proprietary software unique to the BAS by utilizing a standard HTML client program without regard to their physical location.

Efforts have been made to provide facility managers and users with some capability to monitor, configure and control a BAS locally or remotely. Exemplary of these are the national retail store chains variety which utilize proprietary software platforms, dedicated phone lines, and host computers to run many if not all of the BAS's of their stores remotely. Each building has a dedicated telephone line that connects the BAS of each retail store and a host computer system at corporate headquarters or some other host facility. Both the host system and the BAS incorporate proprietary software platforms esoteric to their particular corporation to monitor and control the BAS of each individual store. The proprietary software package has an administrative utility for configuring, managing and troubleshooting the BAS of each individual store. The platform allows an authorized user to perform a number of tasks relating to a BAS located anywhere on the network[1]. For example, the administrator can gather status information and display the operational status and connection status of a given BAS on the screen of the host computer by using a mouse or other pointing device to select (i.e., "click on") the "status" button appearing thereon.

[1] Similar parameters are also used to enable authorized users to remotely monitor and control items such as copiers, printers, elevators, laundry machines and other devices attached to a network.

While the foregoing capabilities are useful, there are three major deficiencies that remain unaddressed or unsolved by the prior art.

The first and foremost deficiency is, that for authorized users to access their BAS, their Client must contain the proprietary software necessary to interface with the server in the BAS. Without the proprietary software, authorized users are unable to access the BAS. Thus, if the user is removed and away from the host or network location where the user normally monitors their BAS(s), they will be unable to control, configure, and monitor the BAS unless they have access to a Client with the requisite software (and the ability to connect to the network location or host facility). If no connection is available, the user will not be able to access, or have very limited access to, the BAS they desire to monitor, control and configure.

A second deficiency is the proprietary nature of the network platforms that require direct access to the network or host location from which an authorized user can monitor, control and configure the BAS. If the BAS operator is traveling away from the network location, they may not be able to gain access to the network, and/or their access will be limited by virtue of their physical separation from the host and/or network location even IF they have the proprietary software necessary to interface with the BAS.

Yet another deficiency of the prior art is that management of the BAS requires proprietary software and protocols to be installed at the site of the BAS and also at the site of the user. If either the protocols or the software have to be altered at one of the BAS sites or the user, it becomes necessary to ensure that updated, corresponding software is downloaded at the site of the other to maintain remote control of the BAS.

SUMMARY OF THE INVENTION

The system described herein overcomes the above-described problems and deficiencies by providing the authorized user (i.e. password or other security clearance) of a Client with HTML client program access via TCP/IP to the linked or embedded HTML server of a BAS that provides the user with a visual and functional interface panel of said BAS without needing the proprietary software of the above-mentioned systems and/or without requiring direct access to the system or network. The interface panel is provided via the HTML client program through its Internet connections. The present system thus provides an authorized user with the ability to access and use all features of the BAS interface panel regardless of the user's location as long as the authorized user has access to a Client with an HTML client program and an Internet connection. This access is accomplished without needing proprietary software but only an HTML client program that is now typically available without charge, or for a minimal charge, from their manufacturers. Using the interface panel generated on the display of the client, an authorized user can monitor, control, configure and interact with the BAS through its linked or embedded HTML server using a mouse or other convenient input device to "select" the pushbuttons or other interface panel devices.

In the embodiment to be described herein, the present system achieves the foregoing by inserting a standard HTML server within, or linking the HTML server with, an established BAS-host that communicates with any HTML client program via TCP/IP. Using TCP/IP, any HTML client program is enabled to present a BAS interface panel to authorized users without needing the proprietary protocols and software of previous systems since the HTML client program and the BAS communicate via the established and standard protocols (i.e. TCP/IP) of the HTML client program. Communications via the HTML client program to the BAS enable authorized users to effectively select the pushbuttons or other control devices on the interface panel that are represented on the Client. Such selections, whether single, sequential or combinational, result in the same response by the BAS as any other similar selections of any other Client with authorized access via their HTML client program regardless of their location with respect to the actual BAS. Furthermore, in accordance with the present invention, the described system provides access for a remote user via their HTML client program to visually monitor the status of multiple BAS's at the same time from the same HTML client program display by displaying a list of BAS links available to the user who can browse to the desired BAS.

Drawing Description

These and other aspects of the invention, its structure and use will be made even more clear to the person of ordinary skill in the art upon review of the following detailed description and the appended drawings in which like reference numerals designate like items and which are briefly described below.

Details

DETAILED DESCRIPTION OF A PREFERRED EMBODIMENT

Figure 1:
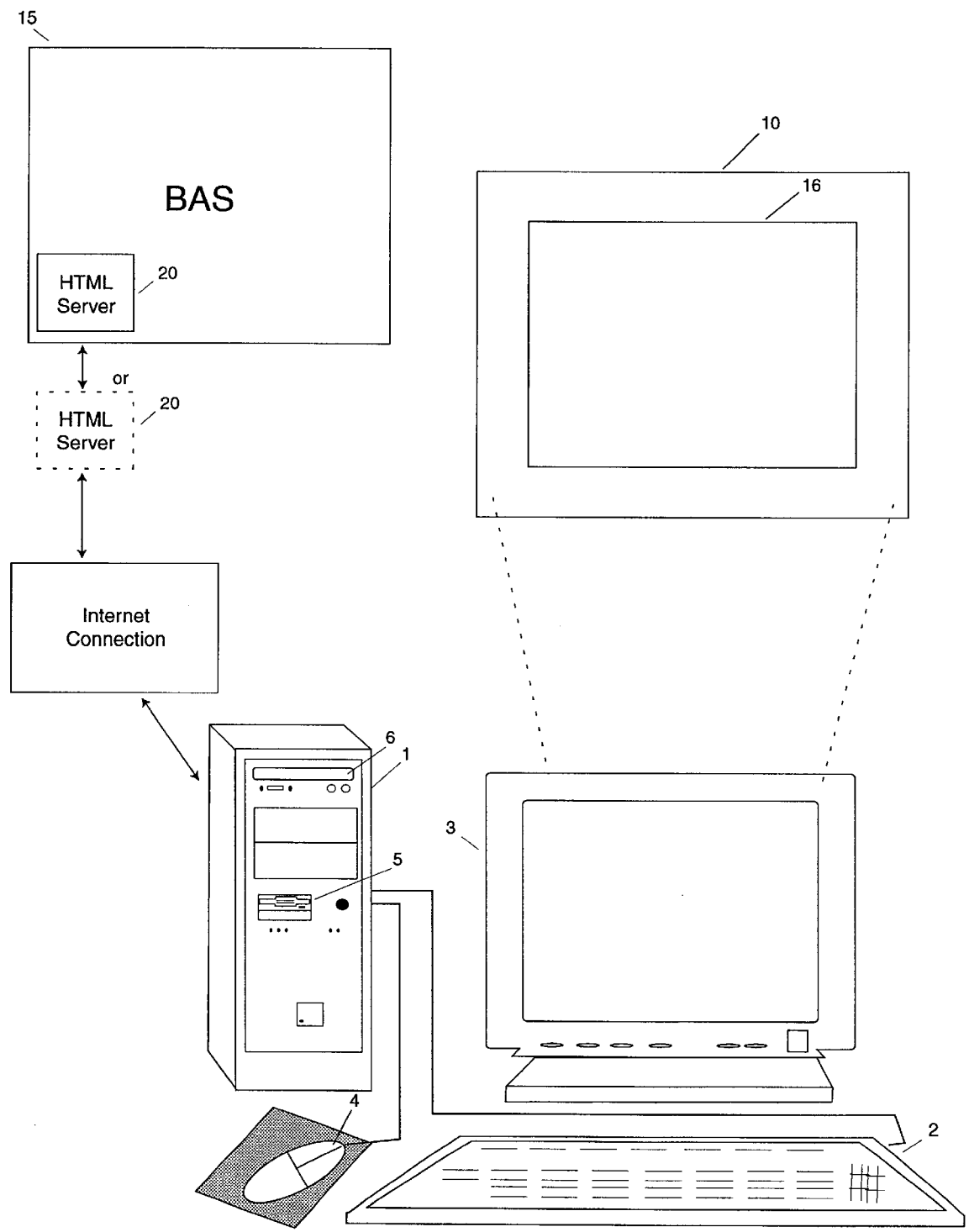
FIG. 1 is a partially diagrammatic, partially pictorial perspective illustration of a HTML capable Client computer with HTML client program and BAS in bi-directional communication via TCP/IP according to the present invention.

With reference to FIG. 1 there is shown a typical computer 1 ("Client 1") that is HTML capable and has installed an HTML client program 10 with keyboard 2 and a video display 3 ("Display 3"). Client 1 is also preferably connected to a "mouse" 4 and/or other suitable pointing device(s) capable of "clicking on" or otherwise indicating and selecting features appearing on Display 3. Client 1 with HTML client program 10 may suitably comprise a personal computer that runs an HTML client program equivalent to Netscape Navigator 4.0 or Microsoft Internet Explorer 4.0 or higher. Client 1 will also typically include an internal hard drive or other suitable program memory, with 3.5-inch disk drive 5 and CD ROM Drive 6, for uploading and downloading programs and data. Client 1 also includes a sufficient amount of internal random access memory (RAM) to support its operating system as well as all applications and utility software desired to be run on Client 1. Client 1 can connect to a local or remote BAS through its linked or embedded HTML server 20 via its Internet connection. HTML server 20 may be linked to BAS 15 externally or embedded within BAS 15 as depicted by FIG. 1. BAS 15 may be physically located at the same physical site as Client 1 or at a completely different physical site from Client 1.

Client 1 is provided with an HTML client program which, in cooperation with HTML server 20 of BAS 15 to be described, facilitates bi-directional communication via TCP/IP between Client 1 and BAS 15 over the internet in order to provide a user of Client 1 with access to BAS Interface Panel 16. Interface Panel 16 is presented on Display 3 of Client 1 through a graphical user interface ("GUI") that paints the visual appearance, status information, and operating characteristics of BAS 15. Interface Panel 16 also includes a display field for providing alphanumeric information as provided by Display 3 and a column of pushbuttons sized and located in positions corresponding to BAS functionality, capability and status information.

Figure 2:
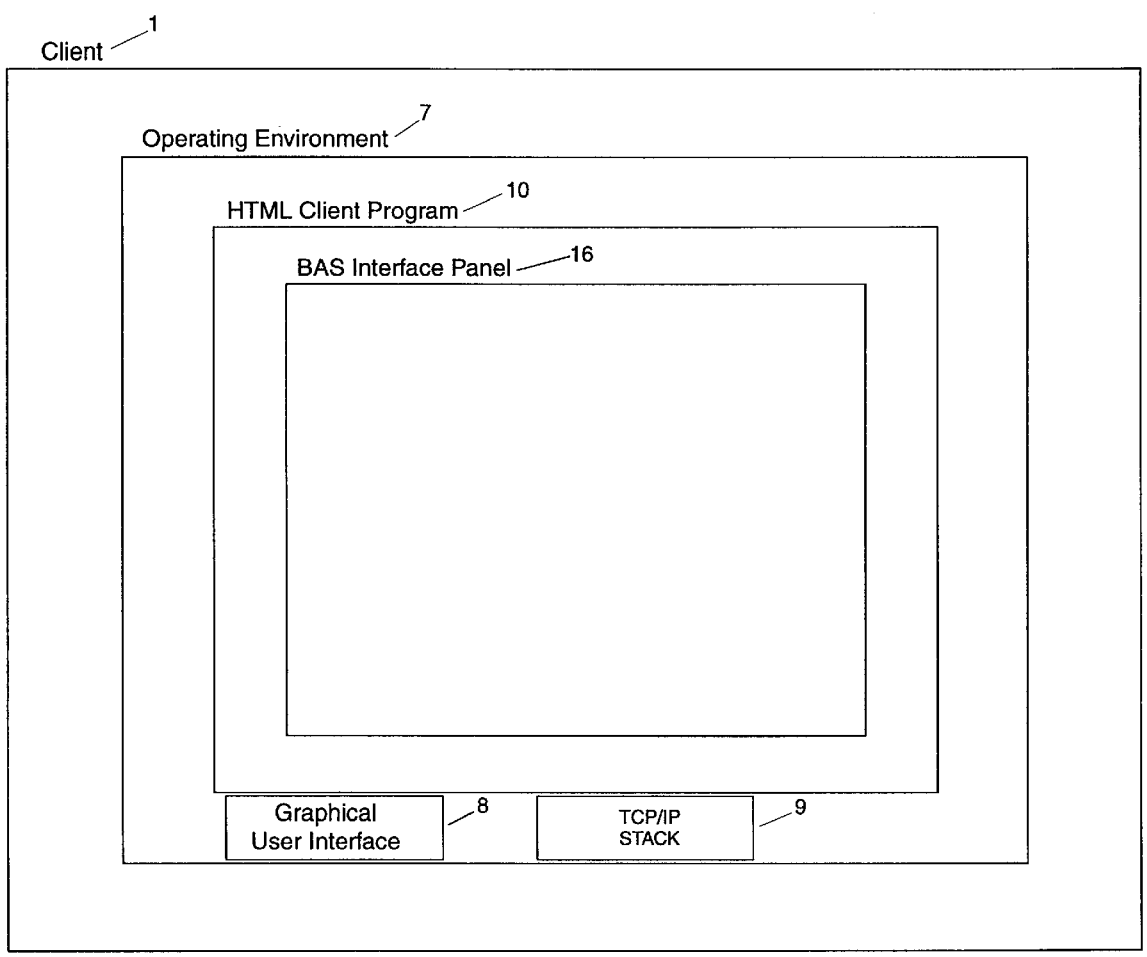
FIG. 2 is an illustration of a suitable software configuration of Client computer.

Referring to FIG. 2 there is illustrated a suitable software architecture of host Client 1. In the preferred embodiment, Client 1 runs a suitable version of DOS (i.e. Microsoft DOS version 6.0 or higher), within an operating environment 7 (i.e. Microsoft Windows 98 or higher). The invention is implemented in part using HTML client program 10 stored within the program memory of Client 1 and capable of running within operating environment 7. Also involved in the process is a TCP/IP stack 9 that "wraps" and "unwraps" the bi-directional communications between HTML client program 10 of Client 1 and HTML server 20 of BAS 15. GUI 8 is a operating environment compatible program that utilizes Applications Program Interfaces (API's) to paint various screens including Interface Panel 16 with various pushbuttons and status information on Display 3 of Client 1. In such a multi-tasking environment, Client 1 with its associated software including HTML client program 10 working in conjunction with HTML server 20 of BAS 15 can generate Interface Panel 16 to provide an authorized user(s) of Client 1 with status information relating to BAS 15.

Figure 3:
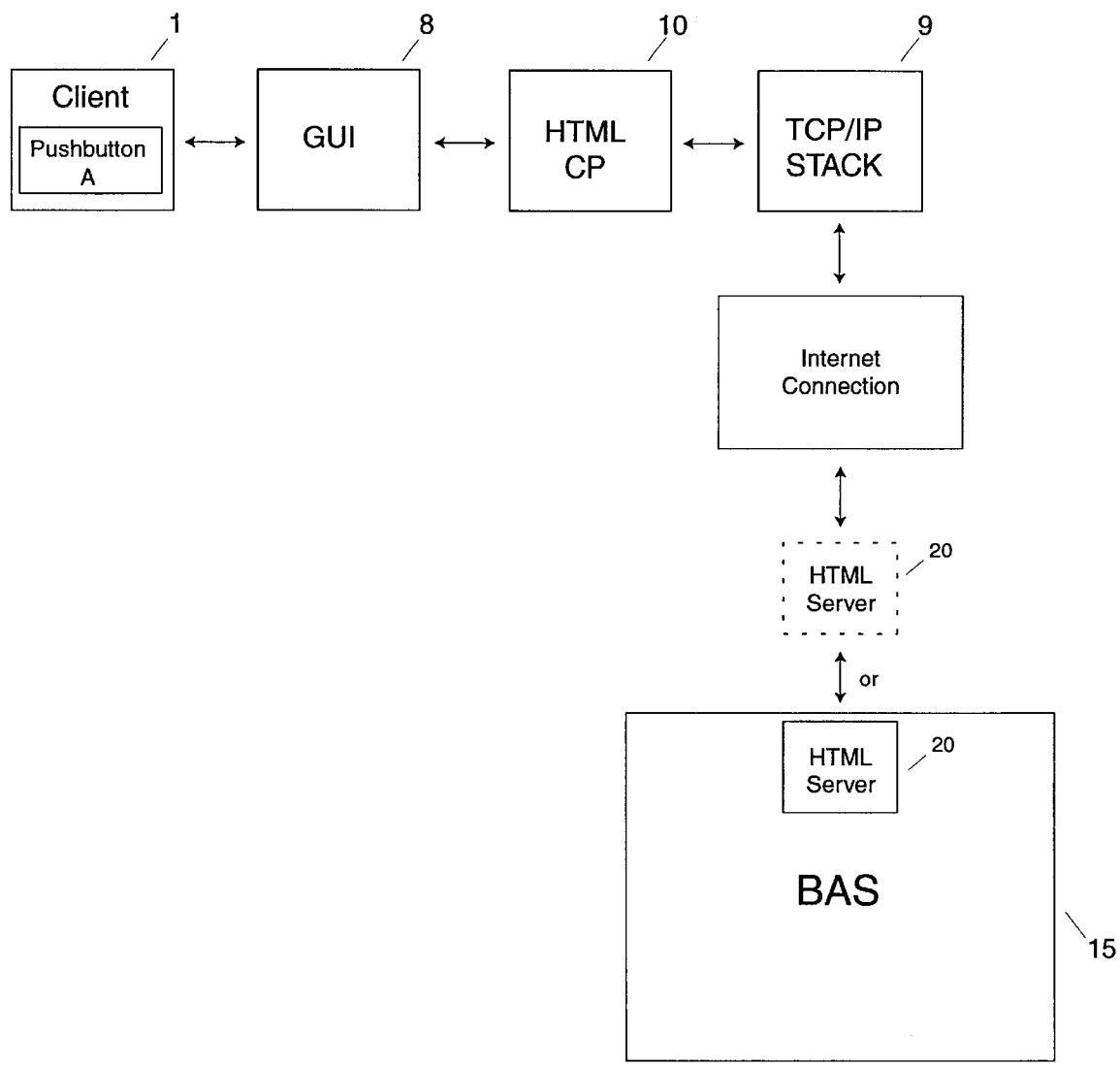
FIG. 3 is a flowchart illustrating the operation of the BAS shown in FIG. 1 when a push-button on the BAS interface panel of a Client is selected.

FIG. 3 provides a flowchart illustration of the operation of a BAS in the preferred embodiment when an authorized user selects a pushbutton on interface Panel 16. When a pushbutton is selected, GUI 8 generates a message whose parameters indicate which pushbutton field was selected. This message is sent through operating environment 7 by GUI 8 to HTML client program 10. HTML client program 10 receives the message from GUI 8, translates it into HTML format and relays such information to the TCP/IP stack 9 for "wrapping. The information is then wrapped by the TCP/IP stack 9 and sent via TCP/IP protocols to HTML server 20 which is linked to or embedded within BAS 15. HTML server 20 processes and then outputs the data packet commands to BAS 15, which can then be properly executed by the BAS 15.

Figure 4:
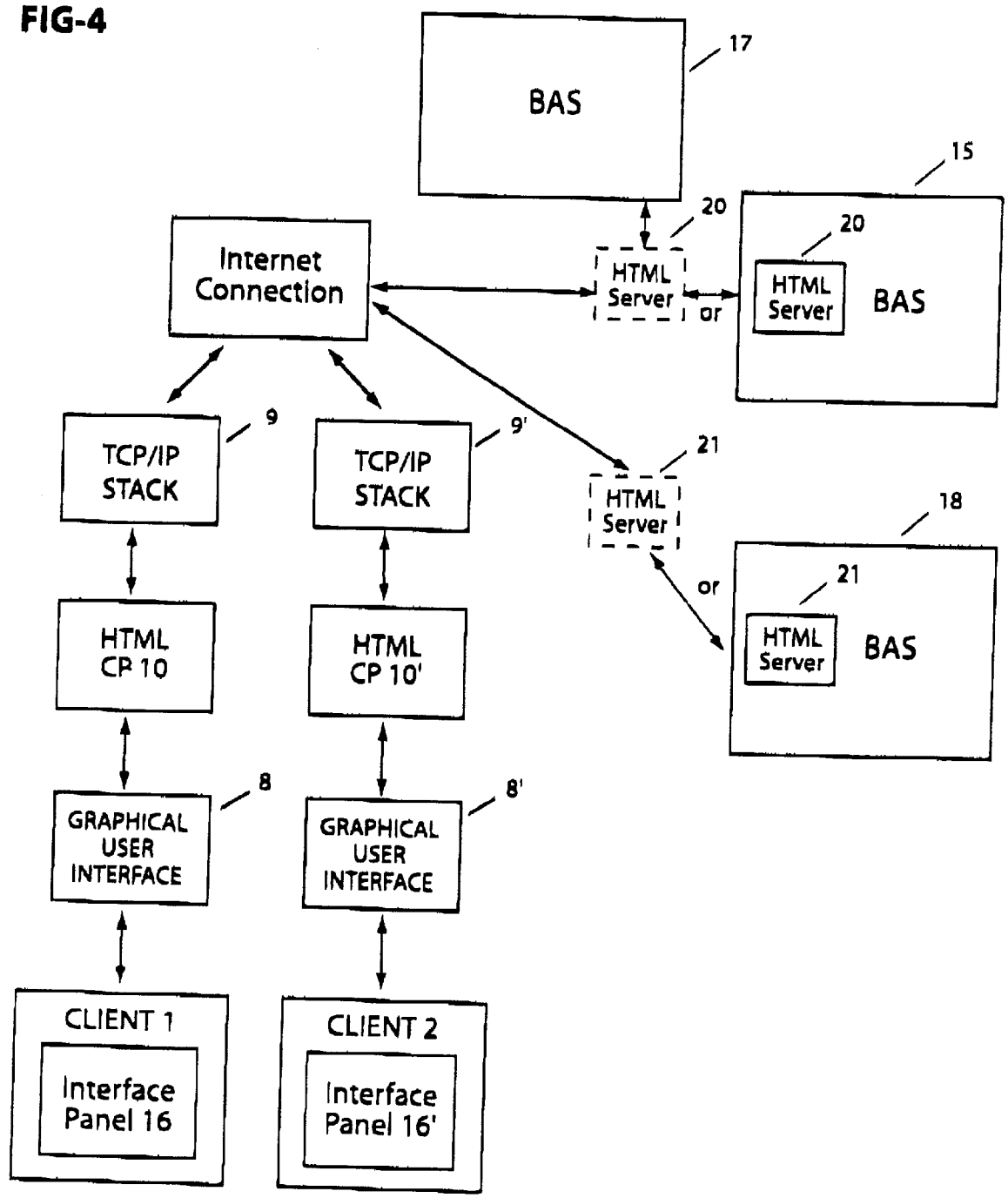
FIG. 4 is a flowchart illustrating the operation of the Client host of FIG. 1 when a button field on the interface panel of a different Client computer is selected.

HTML client program 10 also implements functions for receiving information concerning BAS 15 in TCP/IP, "unwrapping them" with TCP/IP stack 9, and relaying the information to GUI 8 for output to Display 3 and Interface Panel 16 when other authorized user(s) use a different HTML capable computer ("Client 2") either on or off-site to further configure, alter and control BAS 15 as described in FIG. 4.

FIG. 4 is a flowchart illustrating the operation of Client 2 when a pushbutton on the interface panel of Client 1 is selected. The explanation of FIG. 3 is incorporated by reference herein.

Note, as an aside, that the locations of Client 1 and Client 2 with respect to BAS 15 are irrelevant as long as both Client 1 and Client 2 are HTML capable, have installed HTML client programs, and have an internet connection. Neither Client 1 nor Client 2 requires any additional software including any proprietary software unique to the BAS for an authorized user(s) to access BAS 15. Client 1 may be on-site with BAS 15, while Client 2 is off-site, or vice versa; or both Client 1 and Client 2 may be on-site with BAS 15, or both Client 1 and Client 2 may be off-site from BAS 15 at a completely separate physical location.

When an authorized user of Client 1 selects a pushbutton, the steps identified above in the explanation for FIG. 3 take place. Meanwhile, suppose another authorized user accesses the same BAS 15 via Client 2. After the authorized user of Client 2 browses to the same BAS through HTML client program 10' loaded on Client 2, Client 2 displays the substantially same interface Panel 16' as Client 1 with the same characteristics as Client 1. When the authorized user of Client 2 selects BAS 15 through their HTML client program 10' located within Client 2, HTML client program 10' automatically polls, and continues to poll at preset intervals via TCP/IP and its internet connection, HTML server 20 which is linked with or embedded in BAS 15. Note also, that HTML server 20 may be linked to and can control other BAS's such as BAS 17 as depicted in FIG. 4. This polling requests BAS characteristics of BAS 15 through the appropriate TCP/IP command requests for BAS status and configuration. The commands are transmitted via TCP/IP through the Internet to HTML server 20 in BAS 15.

HTML server 20 issues the Interface panel Messages to the active BAS 15. The active BAS 15 responds by returning the message presently received by it including the recent commands received from Client 1 and displayed on Interface Panel 16, to HTML server 20 which relays the information to HTML client program 10' in Client 2. HTML client program 10' transfers the data through the communication process illustrated in FIG. 3 to repaint Interface Panel 16' of Client 2 in accordance with the data received so that Interface Panel 16' on Client 2 now reflects the changes to BAS 15 (if any) made by Client 1.

HTML client program 10 is capable of obtaining this configuration information from the linked or embedded HTML server of any BAS available to Client 1. HTML client program 10 performs the task of encapsulating bi-directional communication functionality for each HTML server located in each BAS by periodic polling through the Internet. In practice, various techniques can be employed for determining if TCP/IP functionality is "on" at a particular BAS, such as sending a request for status information via HTML client program 10 and determining if the appropriate TCP/IP reply is received from the HTML server linked to, or embedded within, each BAS.

Client 2 Interface Panel 16' displays this information to the user of Client 2 in the same format in which it appears on the Client 1 Interface Panel 16 of BAS 15. Note again, that the authorized user of Client 2 may desire to configure BAS panel 16 after viewing its status conditions and may select pushbuttons via their interface Panel 16'. The same process described above would then be replicated in reverse with the ultimate consummation being that the authorized user of Client 1 would then be the recipient of the changes to BAS 15 status initiated by the authorized user of Client 2. By presenting the information in the same format and at relatively the same time to their respective authorized users, Interface Panel 16 and Interface Panel 16' of the invention permits users of Client 1 and Client 2 to acquire and use the information rapidly and efficiently without confusion as to where to look within Interface Panel 16' to find desired information or the meaning of the information presented. Furthermore, Clients 1 and 2 may also configure more than one BAS at a time by browsing to the various BAS links. Thus, BAS 17 and BAS 18 are also available to both Clients through their internet connections with BAS 17 being linked to the same HTML server 20 as BAS 15, and BAS 18 being linked to the Clients through its own linked or embedded HTML server 21.

While the foregoing constitutes a preferred embodiment of the invention, according to the best mode presently contemplated by the inventors of making and carrying out the invention, the invention is not limited to the embodiment described. In light of the present disclosure, various alternative embodiments will be apparent to those skilled in the art. Accordingly, changes can be made without departing from the scope of the invention as pointed out and distinctly claimed in the appended claims as interpreted literally or expanded to include all legal equivalents.

What is claimed is:

1. A controlling system including an HTML client program with an associated HTML capable device, without needing any other proprietary software, and regardless of physical location, in bi-directional communications via TCP/IP with an HTML server that is linked to or embedded within a Building Automation System ("BAS"), said HTML server in conjunction with said controlling system generating interface panel images appearing on the HTML capable device screen for authorized user(s), said image including current BAS status, monitoring, controlling, and configuring information for a selected BAS.

2. The controlling system as recited in claim 1, wherein said HTML server may be linked to one or more BAS's, said HTML server in conjunction with said controlling system generating interface panel images appearing on the HTML capable computer monitor screen for authorized user(s), said image including current BAS status, monitoring, controlling, and configuring information for a selected BAS.

3. The controlling system as recited in claim 2, wherein said linked or embedded HTML server of said BAS, is configured to respond to periodic polling requests from HTML Client program of any HTML capable device to generate and display in substantially real time, updated various interface panels that provide status conditions occurring at the BAS, said computer receiving BAS status information from HTML server of said BAS via TCP/IP.

4. The controlling system as recited in claim 3, wherein said HTML Client program in conjunction with the HTML capable computer and monitor screen allows an authorized user(s) to select various pushbuttons located on the interface panels generated by the controlling system to control, alter, manipulate, and configure said status conditions of the selected BAS.

5. The controlling system as recited in claim 4, further comprising one or more additional, associated HTML capable device(s) in bi-directional communications via TCP/IP with the HTML server linked to or embedded within said BAS referenced in claim 1, without needing any other proprietary software, additional telephone, cable or network lines and regardless of its physical location, said HTML server in conjunction with said controlling system generating interface panel images appearing on all of the HTML capable devices' monitor screen(s), said image(s) including current BAS status, monitoring, controlling, and configuring information for a selected BAS.

6. The controlling system as recited in claim 5, wherein said linked or embedded HTML server in said BAS, is configured to respond to periodic polling requests from HTML Client program(s) of the associated HTML capable device(s) and monitor screen(s) so as to generate and display at substantially the same time on the monitor screen(s) of the various interface panels, various updated status information of the BAS, said computer(s) receiving such BAS status information from HTML server of said BAS via TCP/IP.

7. The controlling system as recited in claim 6, wherein said HTML Client program(s) in conjunction with the additional HTML device(s) and monitor screen(s) allow authorized user(s) to select various pushbuttons located on the interface panels generated by the controlling system to control, alter, manipulate, and configure said status conditions of the selected BAS, said changes in the status conditions of the BAS to be reflected on the monitor screen(s) of the other users who did not make said changes via claim 5.

8. The controlling system as recited in claim 7 further comprising, multiple BAS's in bi-directional communications through their linked or embedded HTML servers via TCP/IP with the controlling system including one or more HTML capable device(s) and monitor screen(s), said BAS's including linked or embedded HTML servers that generate interface panel images appearing on the HTML capable device(s') monitor screen(s), said images including current BAS status, monitoring, controlling, and configuring information for a selected BAS.

9. The controlling system as recited in claim 8, wherein said linked or embedded HTML servers in said BAS's, are configured to respond to periodic polling requests from HTML Client program(s) of the associated HTML capable device(s) and monitor screen(s) when a particular BAS is selected by an authorized user(s) to generate and display updated interface panels that provide status conditions occurring at the BAS, said computers receiving BAS status information from said HTML servers of the BAS via TCP/IP, said authorized user(s) then being able to select a different BAS with their HTML client program to generate and display updated interface panels that provide status conditions occurring at a different BAS.

10. The controlling system as recited in claim 9, wherein said HTML Client program(s) in conjunction with the HTML capable device(s) and monitor screen(s) allows authorized user(s) to select various pushbuttons located on the interface panels generated by the controlling system to control, alter, manipulate, and configure said status conditions of a selected BAS, said authorized user(s) then being able to select a different BAS and control, alter, manipulate, and configure status conditions of a different BAS, said BAS status condition changes being reflected on the interface panels of other Clients when other authorized user(s) select the altered BAS with their HTML client program.

* * * * *